UNITED STATES PATENT OFFICE.

CICERO A. SIMMONS, OF WALDO, FLORIDA.

IMPROVEMENT IN MEDICAL COMPOUNDS FOR TREATING CONSTIPATION, &c.

Specification forming part of Letters Patent No. 121,904, dated December 12, 1871.

*To all whom it may concern:*

Be it known that I, CICERO A. SIMMONS, of Waldo, in the county of Alachua and State of Florida, have invented a new and valuable Improvement in Medical Compounds; and I do hereby declare that the following is a full, clear, and exact description of the composition of the same.

This invention has relation to a medical compound for the treatment of constipation, headache, indigestion, colic, and especially useful to women during pregnancy as a remedy against costive bowels, swimming of the head, and sickness at the stomach.

To prepare this medicine, take six ounces of senna, three ounces of *serpentaria Virginia*, two ounces of *apocynum androsæmifolium*, and two ounces of buchu. Put the above-mentioned ingredients in an earthenware vessel and pour upon them a gallon of boiling water. Cover the mixture so as to prevent the escape of steam and allow it to stand twenty-four hours. Then add half a gallon of proof spirits and stir the mixture thoroughly. Re-cover and allow it to stand twenty-four hours longer. Strain well through a linen or cotton cloth. When cool, the medicine is ready for use.

What I claim as my invention, and desire to secure by Letters Patent, is—

The medicine herein described, compounded of the ingredients, in the manner, and for the purposes specified.

In testimony that I claim the above I have hereunto subscribed my name in the presence of two witnesses.

CICERO A. SIMMONS.

Witnesses:
J. M. SPARKMAN,
J. L. KRIMMINGER. (98)